United States Patent
Zirwas

(10) Patent No.: US 10,243,712 B2
(45) Date of Patent: Mar. 26, 2019

(54) CODED ALLOCATION OF CHANNEL STATE INFORMATION REFERENCE SIGNALS

(71) Applicant: Nokia Solutions and Networks Management International GmbH, Munich (DE)

(72) Inventor: Wolfgang Zirwas, Munich (DE)

(73) Assignee: Nokia Solutions and Networks GMBH & Co. KG, Munich (DE)

( * ) Notice: Subject to any disclaimer, the term of this patent is extended or adjusted under 35 U.S.C. 154(b) by 0 days.

(21) Appl. No.: 15/528,937

(22) PCT Filed: Jan. 23, 2015

(86) PCT No.: PCT/EP2015/051343
§ 371 (c)(1),
(2) Date: May 23, 2017

(87) PCT Pub. No.: WO2016/087055
PCT Pub. Date: Jun. 9, 2016

(65) Prior Publication Data
US 2017/0331604 A1   Nov. 16, 2017

(30) Foreign Application Priority Data
Jan. 23, 2015   (WO) ................ PCT/EP2014/076242

(51) Int. Cl.
*H04L 5/00*   (2006.01)
*H04B 7/06*   (2006.01)
*H04L 1/00*   (2006.01)

(52) U.S. Cl.
CPC ......... *H04L 5/0048* (2013.01); *H04B 7/0626* (2013.01); *H04L 1/0009* (2013.01)

(58) Field of Classification Search
CPC .... H04B 7/0626; H04L 1/0009; H04L 5/0048
See application file for complete search history.

(56) References Cited

U.S. PATENT DOCUMENTS

| | | | |
|---|---|---|---|
| 2012/0002740 A1 | 1/2012 | Han et al. | |
| 2012/0176982 A1 | 7/2012 | Zirwas et al. | |
| 2013/0016686 A1 | 1/2013 | Li et al. | |
| 2013/0094543 A1* | 4/2013 | Zhang ................ | H04L 5/0023 375/219 |

(Continued)

FOREIGN PATENT DOCUMENTS

WO   2014009539   1/2014

OTHER PUBLICATIONS

Damico et al., "Interference Avoidance Techniques and System Design", ARTIST4G, V 1.1, Jul. 2012, pp. 1-276.

(Continued)

*Primary Examiner* — Mohamed A Kamara
(74) *Attorney, Agent, or Firm* — Harrington & Smith

(57) ABSTRACT

Systems, methods, apparatuses, and computer program products for coded allocation of channel state information (CSI) reference signals (RS) are provided. According to one method, the CSI-RSs are allocated by a network node into a square matrix, such that each CSI_RS is transmitted over several predefined antenna ports, allowing user equipment to reconstruct individually any 2N out of $N^2$ channel components.

10 Claims, 12 Drawing Sheets

(56) References Cited

U.S. PATENT DOCUMENTS

| | | | | |
|---|---|---|---|---|
| 2014/0369291 A1* | 12/2014 | Zhang | ................... | H04L 1/0026 370/329 |
| 2015/0215016 A1* | 7/2015 | Hunukumbure | ...... | H04L 5/0023 370/280 |
| 2016/0065290 A1* | 3/2016 | Zhu | ................... | H04W 52/0209 370/329 |
| 2016/0087708 A1* | 3/2016 | Kang | ................... | H04B 7/0619 370/312 |

OTHER PUBLICATIONS

International Search Report and Written Opinion received for corresponding Patent Cooperation Treaty Application No. PCT/EP2014/076242, dated Jul. 24, 2015, 9 pages.

International Search Report and Written Opinion received for corresponding Patent Cooperation Treaty Application No. PCT/EP2015/051343, dated Jul. 24, 2015, 8 pages.

3GPP TSG RAN1 #57 "On Serving Cell Muting for OTDOA Measurements" R1-092628 Los Angeles, CA, USA Jun. 29-Jul. 3, 2009.

3GPP TSG RAN WG1 Meeting #59bis "Inter-cell CSI-RS Analysis" R1-100248 Valencia, Spain, Jan. 18-22, 2009.

* cited by examiner

| CSI_v\CSI_h | CSI_h_1 | CSI_h_2 | CSI_h_3 | CSI_h_4 | CSI_h_5 | CSI_h_6 | CSI_h_7 | CSI_h_8 | CSI_h_9 |
|---|---|---|---|---|---|---|---|---|---|
| CSI_v_1 | | | | | H(1,5) | | H(1,7) | | |
| CSI_v_2 | | | | | | H(3,8) | | | |
| CSI_v_3 | | | | | H(3,5) | | H(3,7) | H(3,8) | |
| CSI_v_4 | | | H(4,3) | | H(4,5) | | | | |
| CSI_v_5 | | | | | | | | | |
| CSI_v_6 | H(6,1) | | | | | H(6,6) | | | |
| CSI_v_7 | | | | | | | | | |
| CSI_v_8 | | | | | | | | | |
| CSI_v_9 | | | | | | | | | |

Fig.3

CODED ALLOCATION OF CHANNEL STATE INFORMATION REFERENCE SIGNALS

RELATED APPLICATION

This application was originally filed as PCT Application No. PCT/EP2015/051343 filed Jan. 23, 2015 which claims priority benefit from PCT Application No. PCT/EP2014/076242, filed Dec. 2, 2014.

BACKGROUND

Field

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) and/or 5G radio access technology.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-11, LTE Rel-12, LTE Rel-13, etc.) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One the key features of LTE-A is carrier aggregation, which allows for increasing the data rates through aggregation of two or more LTE carriers.

SUMMARY

One embodiment is directed to an apparatus, which may include allocating means for allocating channel components into a square matrix. The allocating means may comprise means for allocating to each row of the square matrix one of a plurality of channel state information resource signals and for allocating to each column of the square matrix another one of the plurality of channel state information resource signals.

In an embodiment, the channel state information resource signals may comprise a subset of 9 vertical channel state information resource signals and a subset of 9 horizontal channel state information resource signals, and the channel components may comprise 81 channel components.

Another embodiment is directed to a method, which may include allocating, by a network node, channel components into a square matrix. The allocating may comprises allocating to each row of the square matrix one of a plurality of channel state information resource signals and allocating to each column of the square matrix another one of the plurality of channel state information resource signals.

Another embodiment is directed to an apparatus that may include at least one processor and at least one memory including computer program code. The at least one memory and computer program code may be configured, with the at least one processor, to cause the apparatus at least to allocate channel components into a square matrix. One of a plurality of channel state information resource signals may be allocated to each row of the square matrix and another one of the plurality of channel state information resource signals may be allocated to each column of the square matrix.

Another embodiment is directed to an apparatus, which may include receiving means for receiving an allocation of channel components in a square matrix H, where each row of the square matrix H is allocated one of a plurality of channel state information resource signals and each column of the square matrix H is allocated another one of the plurality of channel state information resource signals. The apparatus may also include estimating means for reconstructing relevant channel components by estimating the relevant channel components.

In an embodiment, the apparatus may also include means for identifying the relevant channel components based on long term measurements of path loss values. According to one embodiment, the estimating means may further include means for forming a component matrix, C_NN, for the estimation of N channel components, where there are 2N channel state information resource signals and the component matrix has size $\mathbb{R}^{N^2 \times N^2}$. In an example embodiment, N=9, there are 18 channel state information resource signals, and the component matrix has size $\mathbb{R}^{81 \times 81}$.

According to an embodiment, the estimating means may further include means for reducing the component matrix, C_NN, to a matrix, C_NN_sparse(UE_i), with size $\mathbb{R}^{2N \times 2N}$ using knowledge of irrelevant channel components, where the irrelevant channel components may be those for which H(i,k) is below a certain threshold power with respect to a strongest channel component.

In one embodiment, the estimating means may further include means for constructing C_NN_sparse (UE_i) from C_NN by deleting all zero rows and $N^2-2N$ columns l_irrelevant found from irrelevant channel components of H(i,k) by forming h(l)=vec(H(i,k)).

According to an embodiment, the estimating means further includes means for calculating an estimate of the relevant channel components, h_sparse_est(UE_i), according to the following equation:

$$h\_sparse\_est(UE\_i) = pinv(C\_NN\_sparse(UE\_i)) * y(UE\_i),$$

where y(UE_i) is an estimation vector of size $\mathbb{C}^{2N \times 1}$ of the received signals for all 2N CSI RSs for UE, UE_i, and pinv(x) is the Moore Penrose pseudo inverse.

Another embodiment is directed to a method, which may include receiving, by a user equipment, an allocation of channel components in a square matrix H, where each row of the square matrix H is allocated one of a plurality of channel state information resource signals and each column of the square matrix H is allocated another one of the plurality of channel state information resource signals. The method may also include constructing relevant channel components by estimating the relevant channel components.

In one embodiment, the method may also include identifying the relevant channel components based on long term measurements of path loss values. In certain embodiments, the estimating may further include forming a component matrix, C_NN, for the estimation of N channel components, where there are 2N channel state information resource signals and the component matrix has size $\mathbb{R}^{N^2 \times N^2}$. In an example embodiment, N=9, there are 18 channel state information resource signals, and the component matrix has size $\mathbb{R}^{81 \times 81}$.

According to an embodiment, the estimating may further include reducing the component matrix, C_NN, to a matrix, C_NN_sparse(UE_i), with size $\mathbb{R}^{2N \times 2N}$ using knowledge of irrelevant channel components, where the irrelevant channel components are those for which H(i,k) is below a certain threshold power with respect to a strongest channel component. In one embodiment, the estimating may further include constructing C_NN_sparse(UE_i) from C_NN by deleting all zero rows and $N^2-2N$ columns l_irrelevant found from irrelevant channel components of H(i,k) by forming h(l) =vec(H(i,k)).

In some embodiments, the estimating may further include calculating an estimate of the relevant channel components, h_sparse_est(UE_i), according to the following equation: h_sparse_est(UE_i)=pinv(C_NN_sparse(UE_i))*y(UE_i), where y(UE_i) is an estimation vector of size $\mathbb{C}^{2N \times 1}$ of the received signals for all 2N CSI RSs for UE, UE_i, and pinv(x) is the Moore Penrose pseudo inverse.

Another embodiment is directed to an apparatus that may include at least one processor and at least one memory including computer program code. The at least one memory and computer program code may be configured, with the at least one processor, to cause the apparatus at least to receive an allocation of channel components in a square matrix H, where each row of the square matrix H is allocated one of a plurality of channel state information resource signals and each column of the square matrix H is allocated another one of the plurality of channel state information resource signals, and to construct relevant channel components by estimating the relevant channel components.

BRIEF DESCRIPTION OF THE DRAWINGS

For proper understanding of the invention, reference should be made to the accompanying drawings, wherein:

FIG. 3 illustrates a square allocation of channel components into channel matrix H with an according allocation of CSI-RSs with 9 vertical (CSI_v_xx) and 9 horizontal (CSI_h_xx) reference signals, according to an embodiment;

DETAILED DESCRIPTION

Figure 1:
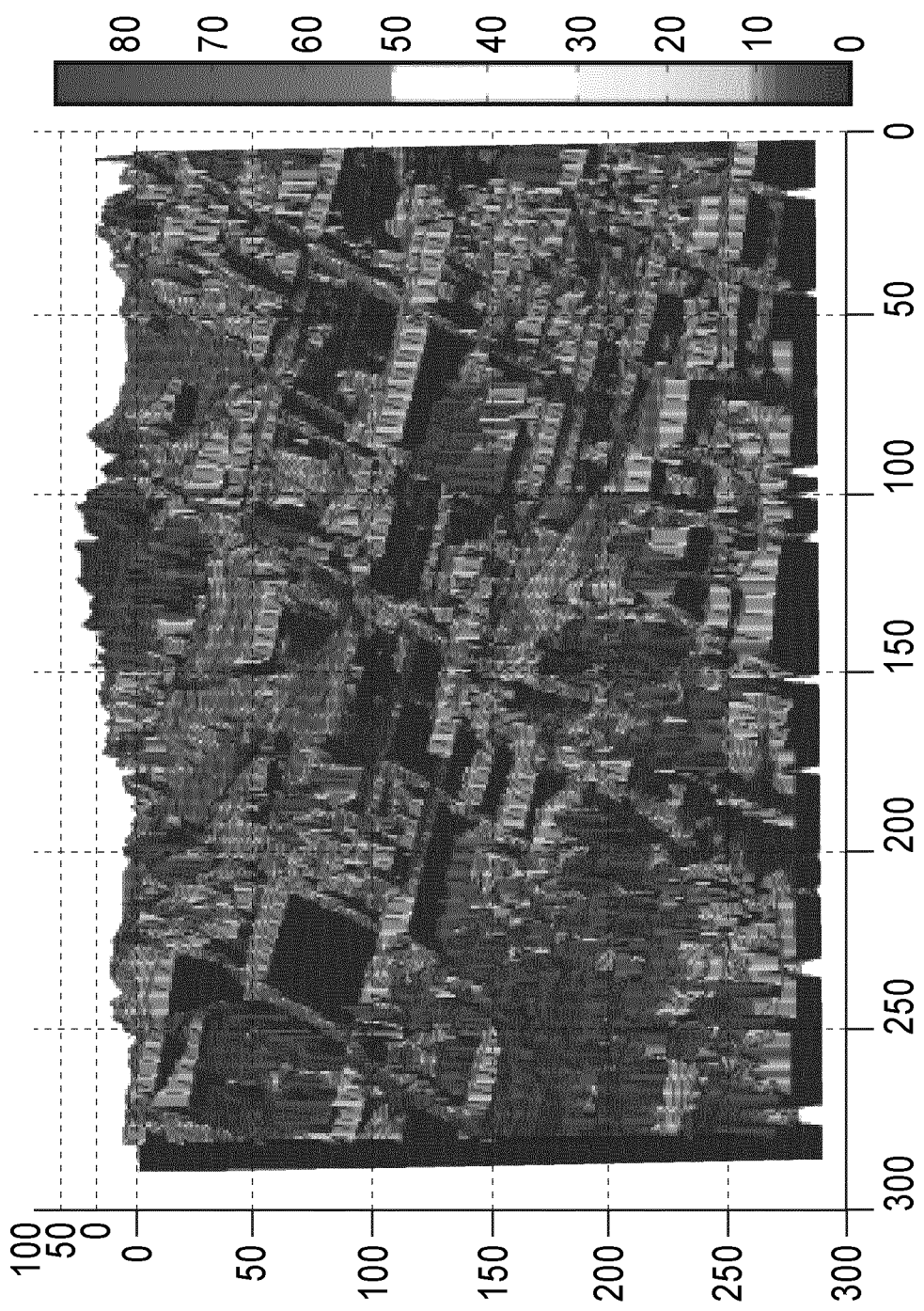
FIG. 1 illustrates an example of the number of relevant channel components (CCs) within a power window of 20 dB for a city center, according to an example embodiment.

It will be readily understood that the components of the invention, as generally described and illustrated in the figures herein, may be arranged and designed in a wide variety of different configurations. Thus, the following detailed description of some embodiments of systems, methods, apparatuses, and computer program products for coded allocation of channel state information (CSI) reference signals (RS), as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As will be discussed in detail below, embodiments of the invention support channel estimation for massive multiple input multiple output (MIMO) and joint transmission (JT) cooperative multipoint transmission (CoMP) systems with lower overhead for orthogonal channel state information reference signals (CSI-RS). In both MIMO and JT CoMP, due to the potentially large number of antennas used for transmissions, the number of channels will be large and in turn the amount of channel state information that needs to be determined will also be large. Determining such a large amount of information will result in high overhead, which can reduce the efficiency of the system. Therefore, some embodiments of the invention provide a mechanism for a channel state information reference signal (CSI-RS) allocation scheme that allows for the estimation of a high number of channel components with a relatively lower number of CSI-RSs. In one embodiment, channel components are allocated to a square matrix (as vertical and horizontal components) for predefined antenna ports. In this way, it is possible for a UE to determine a certain number of channel components. By allocating channel components in this way, the number of CSI-RSs can be reduced, thereby reducing overhead while still allowing for accurate channel estimation.

Further embodiments provide an optimum code design to ensure full rank under all conditions and a further performance boost by suitable switching of the code matrix generating the CSI-RS.

Certain embodiments may relate to 3GPP $5^{th}$ generation (5G) systems, where it is quite generally accepted that massive MIMO as well as JT CoMP can provide significant performance gains (capacity, coverage, energy efficiency). This is true at least under the assumption of ideal channel knowledge.

For massive MIMO, which for example may be implemented at the eNB or base station (BS) side, the number of antenna elements may be increased from a few to potentially hundreds or even more. For proper multi-user (MU) MIMO, precoding channel knowledge per antenna element would be the ideal. However, depending on the concept, potentially more realistic is a channel knowledge per effective channel component, being a certain smaller but still large virtually beamformed subset of all antenna elements.

JT CoMP, especially in combination with massive MIMO, is viewed as a promising solution. It has the same issue, i.e., the need for estimation of a very high number of channel components.

Often for massive MIMO, time division duplex (TDD) is being assumed as it might exploit channel reciprocity. In case of frequency division duplex (FDD), each antenna element or each effective channel component will need an orthogonal allocation in LTE of CSI-RS. These CSI RS should allow for accurate frequency selective channel estimation per channel component, leading to a large overhead in terms of resources (occupied resource elements) and power budget to ensure sufficient signal-to-interference noise ratio (SINR). This may be especially true in case of multi cellular mobile radio networks where adjacent cells require mutually orthogonal CSI RSs and where mobility necessitates a regular channel estimation and reporting, e.g., every 5 to 10 ms. It should be noted that, under certain circumstances, the pilot overhead might be as large as 80% for maximum capacity.

Using the right code and the right allocation of codes to antenna ports is important for guaranteeing, under all circumstances, the full rank for the estimation of the CSI of a sparse number of channel components.

Accordingly, embodiments of the invention provide a CSI RS allocation scheme that allows for an estimation of a high number of channel components with a relative lower number of orthogonal CSI RSs. Certain embodiments further provide an optimum code design to ensure full rank under all conditions and a further performance boost by suitable switching of the code matrix generating the CSI-RS.

Baseline assumption for massive MIMO is often to exploit channel reciprocity for TDD transmission. This might be applicable in certain scenarios but, for usage of massive MIMO and JT CoMP in macro cellular outdoor scenarios with lower end radio frequencies (RF) in the range of a few GHz, FDD may also be considered for several reasons:

Massive MIMO provides largest gains for massive spatial multiplexing of streams and UEs. For that reason TDD means allocation of many mutually orthogonal sounding reference signals (SRS) to many UEs leading to the already above mentioned pilot contamination problems. In case user grouping should be integrated into the scheduler even more users than those being actually scheduled have to send according SRS.

Having many UEs transmitting SRS with strong power (needed for accurate channel estimation) will easily drain their battery power.

Reciprocity based schemes need a powerful RF frontend calibration procedure to ensure sufficiently accurate reciprocity between up- and downlink.

TDD does not provide full knowledge about current interference conditions at the UEs, e.g., interference coming from neighbouring cells.

TDD has significantly lower coverage due to part time transmission, instead of continuous transmission as being possible for FDD UEs.

For 5G systems, channel prediction will likely play a major role to overcome CSI outdating and to make CoMP more robust, as well as massive MIMO transmissions. Channel prediction requires multi frame observation of the evolution of channel components. This would mean that UEs have to transmit SRSs for relatively long times before transmission is possible, which drains battery power and worsens the orthogonality requirements for SRSs. In contrast, for FDD, all UEs in a cell may listen to the periodically broadcasted CSI-RSs for several frames or subframes to estimate a proper channel prediction, which can then be reported as soon as the UE should be scheduled.

For a FDD system, such as LTE or LTE-A, CSI-RS support up to 8×8 MIMO and furthermore allow for 5 muting patterns so that overall 40 orthogonal CSI RSs may be used. The solution for affordable overhead in the range of 5 to 10% has been achieved by sparse allocation of CSI RSs in frequency as well as time, which means some limitations for the reconstruction of the channel transfer function (CTF) as well as the maximum mobility.

It is noted that, the orthogonality between CSI RSs is achieved by a combination of TDMA, FDMA and CDMA together with specific muting patterns, but this has no effect on the number of allocated resource elements.

Current solutions for LTE cannot provide the high number of orthogonal CSI RSs needed in case massive MIMO is integrated at the macro cells. Investigations indicate that, in the near future, more than eight antenna ports (AP) per cell and in case of JT CoMP over three sites with three sectors each, e.g., at least 72 antenna ports per cooperation area will be needed (note, with real massive MIMO these values would further increase greatly to several hundreds of antenna ports). To reduce inter CA interference for the reference signals orthogonal muting patterns per CA would help, but would mean even higher number of occupied resource elements.

At the same time, massive MIMO and CoMP open new options to deal with the estimation of high number of channel components. FIG. 1 illustrates an example that indicates that at the center of the cooperation areas most UEs will see only a small fraction of the high number of transmitted channel components, for example less than 20 or even less than 10. Compared to the overall number of 90 antenna ports the number of relevant channel components seen by UEs is typically just about 10%. In particular, FIG. 1 depicts the number of relevant channel components (CCs) within a power window of 20 dB for Munich city center based on ray tracing simulations for ten fixed narrow (2°) beams per cell, i.e., for a grid of beam (GoB) concept. X- and y-axis are distances and values have to be multiplied by 5 m, i.e. the area is of size 1.5 times 1.5 km$^2$.

Figure 2:
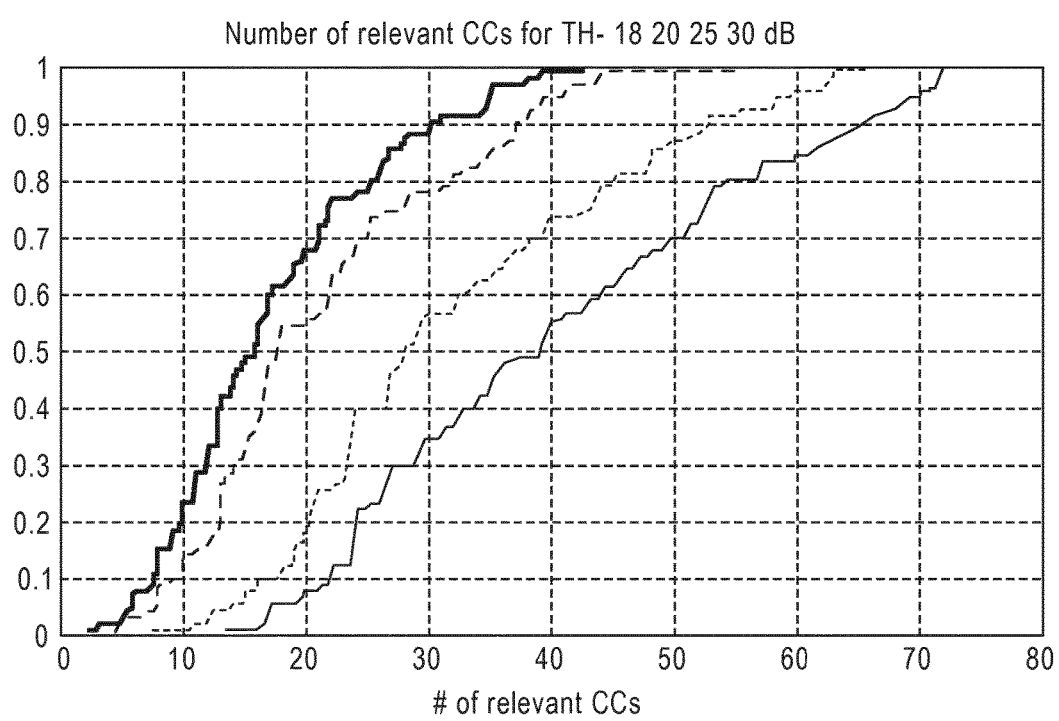
FIG. 2 illustrates sample results of the number of relevant CCs estimated from a macro cellular JT COMP system, according to an example embodiment.

FIG. 2 illustrates similar results for a massive MIMO macro cellular scenario with 8 fixed beams per cell (GoB). More specifically, FIG. 2 illustrates the number of relevant CCs estimated from a macro cellular JT COMP system with inter site distance of 500 m for a RF frequency of 2.6 GHz. This example simulation uses the Quadriga channel model. The different curves represent a different threshold for selecting relevant channel components. −18 dB (left most curve) means that all CCs 18 dB below that of the strongest CC for a certain UE will be counted. The simulation is based on the Quadriga channel model, which is basically the SCM-E channel model with some useful extensions. As can be concluded from the example simulation of FIG. 2, almost all UEs see less than 40 channel components in case of a relative threshold of −18 dB and 70% of UEs see less than 20 CCs from the overall 72 APs.

The reason for this reduction of relevant channel components is a result of the grid-of-beams (GoB) concept generating sets of beams into different angle of departures. In case of extremely narrow beams and line-of-sight (LOS) conditions UEs would receive eventually only one single relevant CC. Due to non-loss-of-sight (NLOS) conditions, the UEs receive several relevant CCs, but significantly less compared to a massive MIMO array without the GoB beamformers.

So UEs should be able to estimate sparse effective channel matrices. In case all UEs would see the same known set of APs, a solution would be to just allocate the set of CSI RSs to the relevant CCs. The challenge is that each UE will have an individual set of relevant CCs and in the end all CCs will be seen by some of the UEs.

An objective of certain embodiments of the invention is to define a CSI-RS allocation scheme that exploits the sparse nature of massive MIMO GoB channel matrices. The challenge is to reduce the number of CSI-RSs to the typical moderate number of relevant CCs per UE (10 to 40 depending on threshold for relevant CCs) despite the high number of potential beams per cooperation area (e.g., L times 72, with L number of muting patterns, L=1 . . . 5) and for different received sets of CCs per UE.

Therefore, one embodiment is configured to allocate channel components (independent of their physical meaning) into square matrices H and to allocate to each row of H one of the CSI-RSs and to each column another one of the CSI-RSs, as illustrated in FIG. 3. The example embodiment of FIG. 3 provides a square allocation of channel components into channel matrix H and according allocation of CSI-RSs with 9 vertical (CSI_v_xx) and 9 horizontal (CSI_h_xx) reference signals, for example. In other words, in this example, overall there are 18 CSI RS allowing for estimation of 18 out of 81 CCs. According to this embodiment, all empty cells are below the threshold and are set to zero. In this way, it is possible to address—with some similarities to a RS code—81 channel components. It should be noted that, while the example of FIG. 3 depicts a 9×9 square matrix, square matrices of a different size may also be used according to other embodiments.

Figure 4:
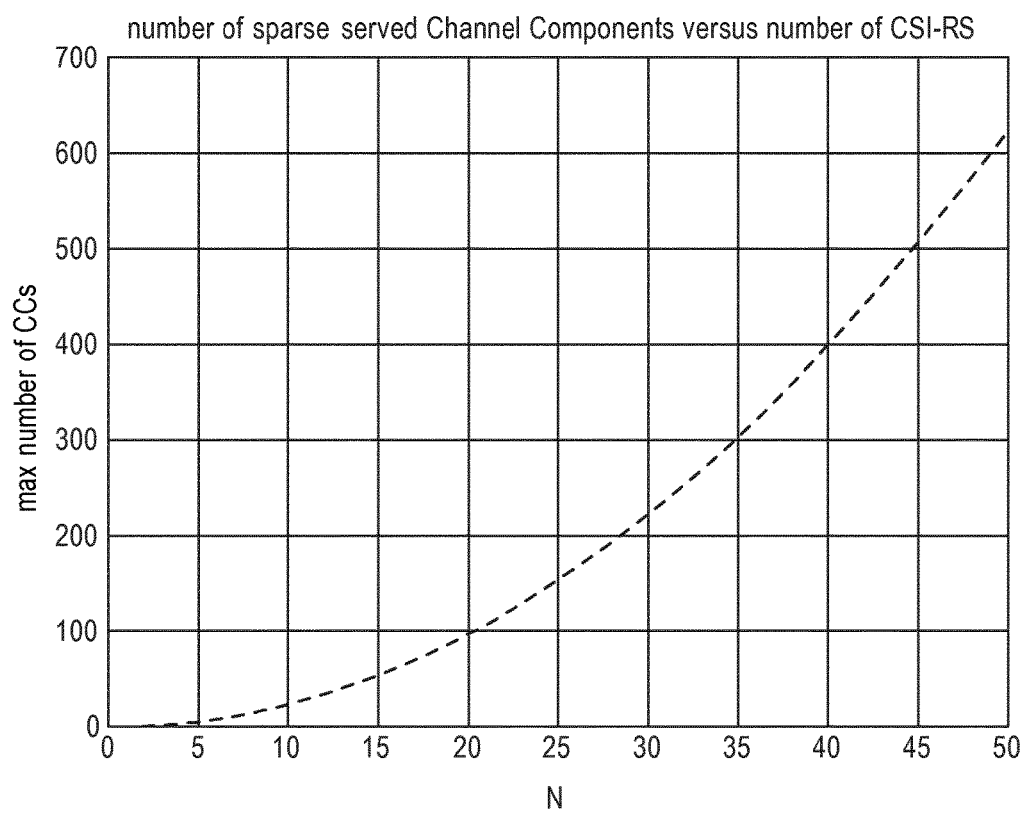
FIG. 4 illustrates a maximum number of supported channel components versus number N of CSI-RS, according to one embodiment.

Generally, embodiments are able to address with N CSI-RS N$^2$ channel components, as illustrated in FIG. 4. The example of FIG. 4 illustrates a maximum number of supported channel components versus number N of CSI-RS. For example, with 40 CSI-RS according to LTE, up to 400 sparse channel components can be resolved. Assuming for example 40 orthogonal CSI-RSs as being available from LTE-A, overall 400 channel components could be served.

Figure 5:
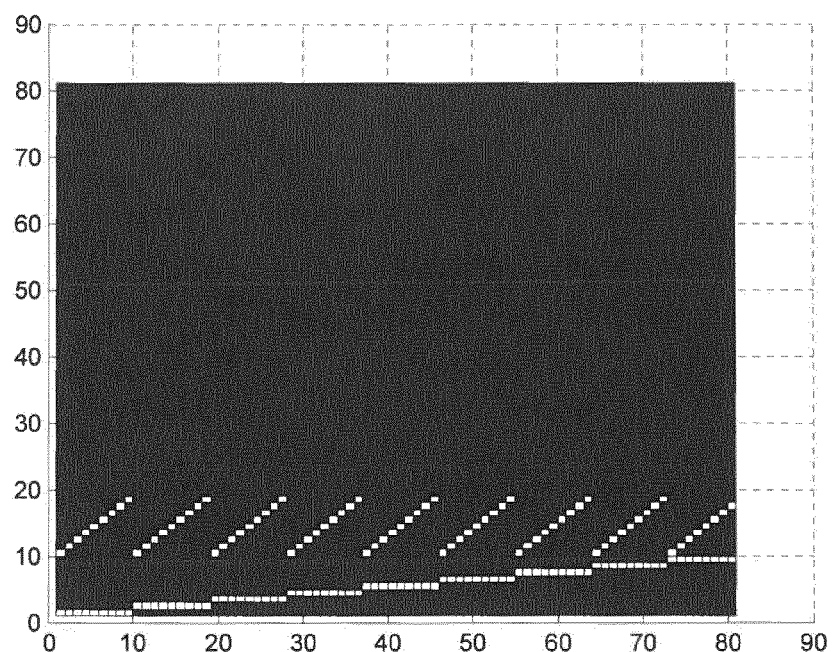
FIG. 5 illustrates an example component matrix C_NN for N=9, according to an embodiment.

For the estimation of the sparse N channel components, the component matrix C_NN may be formed. FIG. 5 illustrates an example component matrix C_99 for N=9. In particular, the example of FIG. 5 illustrates a full C_99$^{[81 \times 81]}$ matrix allowing for estimation of 18 relevant out of 81 channel components (CCs) It should be noted that, although FIG. 5 illustrate an example with 18 relevant CCs (where N=9), other values may be used according to other examples and embodiments are not limited to the configuration of FIG. 5. In the example of FIG. 5, all white values are '1' and all black values are '0'. For estimation, all irrelevant CCs below a certain threshold are known, which can be seen as 81-18 additional linear equations of the form $H(i_x,k_x)=0$ (not shown in the matrix above). It is noted that, in this case, 2*N=2*9=18 CSI-RSs are needed and the overall matrix has size $\mathbb{R}^{81 \times 81}$.

According to an embodiment, for example, the estimation of ≤18 out of 81 channel components may be done according to the following steps:

First, each UE identifies its ≤18 relevant channel components based on long term measurements of path loss values. This is possible, for example, by CSI RS, which carry further cell individual Zadoff Chu sequences.

C_99 is known to all UEs, but as the rank of C_99 is at best 18, the UE individual knowledge about irrelevant CCs may be used to reduce C_99 to a matrix. C_99_sparse(UE_i) with size $\mathbb{R}^{[18 \times 18]}$. Irrelevant CCs are those for which H(i,k) is below a certain threshold power TH with respect to the strongest CC. Typical TH values may be −20 dB. In case there are more than 2N (here >18) relevant CCs, then only the 2N (18) strongest CCs are kept, as otherwise the CCs will be not resolvable.

Knowing the irrelevant CCs C_99_sparse(UE_i) can be constructed from C_99 by deleting all zero rows, i.e., rows 2N+1 up to N$^2$ (19 to 81) and the N$^2$-2N (81−18=63) columns l_irrelevant. l_irrelevant can be found from the irrelevant channel components of H(i,k) by forming h(l)=vec(H(i,k)), i.e., vectoring the channel matrix into one channel vector of length $\mathbb{R}^{N^2 \times 1}$. What is left is the matrix C_99_sparse(UE_i) of size $\mathbb{R}^{2N \times 2N}$ and the sparse channel vector h_sparse, where the l_irrelevant channel components from h have been deleted as well.

Estimation of the relevant CCs is done by calculating: h_sparse_est(UE_i)=pinv(C_99_sparse(UE_i))*y (UE_i), where y(UE_i) is the estimation vector of size $\mathbb{C}^{2N \times 1}$ of the received signals for all 2N CSI RSs for UE UE_i and pinv(x) is the Moore Penrose pseudo inverse. The CSI-RS may be allocated at the eNB side according to the matrix C_99. In other words, in certain embodiments, the CSI_RS is not allocated per channel component H(i.k) or h(l), but is allocated according to the table depicted in FIG. 3, i.e., CSI_h_1 is transmitted from the APs 1 to 9, CSI_h_2 from APs 10 to 18 and so on.

Thus, according to embodiments of the invention, the CSI-RSs are allocated similar to the table illustrated in FIG. 3, such that each CSI_RS is transmitted over several predefined antenna ports, allowing UEs to reconstruct individually any 2N out of $N^2$ channel components.

In an embodiment, the pseudo inverse matrix pinv (C_99_sparse) for reconstruction of the sparse channel components, may be calculated for the UE individual sets of relevant channel components. As these are defined by the large scale conditions, the recalculation of this matrix is required only very seldom, e.g., every few seconds. Furthermore, the same matrix can be reused for all physical resource blocks (PRBs), i.e., the full frequency band. Therefore, the processing overhead is negligible similar as the overhead for storing the 2N×2N matrix.

According to an alternative embodiment, the allocation of CSI RSs to APs may be adapted depending on load conditions, i.e., in case of low load LTE-A allocation may be used, for example, together with less but broader Tx-beams. For high load, the system may be switched to the massive MIMO mode with the above-described allocation of CSI-RS to APs. This alternative may require broadcast messages to inform all UEs about the current allocation.

In addition to channel estimation, certain embodiments may be used for the detection of failed antenna elements for large massive MIMO antenna panels. A failed antenna element may be detected, for example, by evaluating the mean Rx power of all CSI-RS over all PRBs and over longer time intervals. Knowing failed elements may be beneficial as the precoder can then be adapted accordingly, leading to minor performance losses as long as the number of failed elements is small.

Additionally, instead of the quadratic low, embodiments might find allocation of CSI-RS by a cubic or higher law, i.e., in 3 or more dimensions, which would further reduce the number of relevant to overall channel components.

Figure 6:
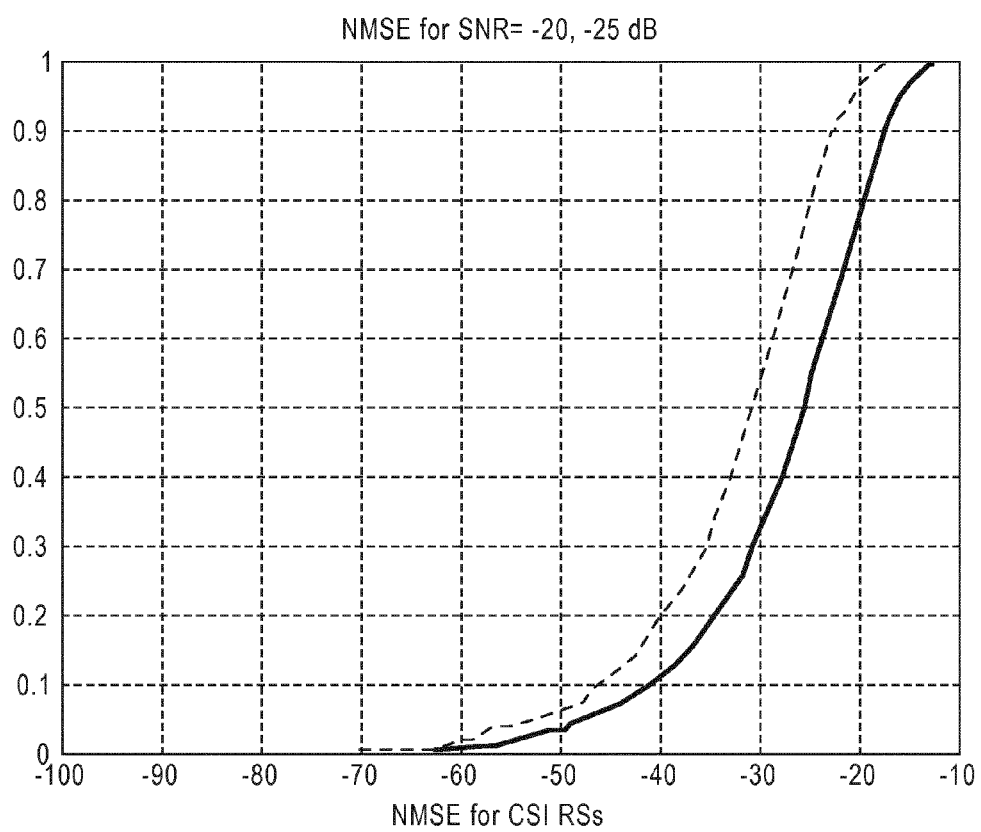
FIG. 6 illustrates a simulated NMSE of the estimated channel components, according to an embodiment.

To analyze the sensitivity to Rx noise according to embodiments of the invention, the C_99 scheme—allowing estimation of 18 relevant from overall 81 CCs—has been implemented and tested in combination with AWGN. The according normalized mean square error (NMSE) for the estimated channel components is depicted in FIG. 6 for a receiver signal to noise ratio (SNR) of the CSI-RSs of −20 and −25 dB. In particular, the example of FIG. 6 illustrates a simulated NMSE of the estimated CCs for a received SNR per CSI-RS of −20 dB (right curve) or −25 dB (left curve) for a sparse CC reconstruction scheme, according to an embodiment. The results are promising as most of the channel components achieve an NMSE of −20 dB or even better, i.e., there is often even a gain compared to the input SNR.

The number of relevant channel components according to FIGS. 1 and 2 are for single antenna UEs. For that reason, it can be expected that together with UE-side beamforming using 2 to 4 Rx-antennas, the number of relevant channel components can be reduced further. In addition, coordinated beamforming, optimized antenna tilting, etc. are other means for decreasing the number of relevant channel components. The proposed concept will benefit from according improvements of future research as the threshold for relevant channel components as well as the number of optimally servable UEs will increase.

Another embodiment is able to ensure always full rank of C_99_sparse for larger matrices, such as for all possible 18 relevant out of 81 possible channel components or even larger. Always having full rank, as provided in this embodiment, is an important basis of coded CSI RS as otherwise the CSI reconstruction may fail at least in some cases. Thus, an embodiment of the invention ensures full rank for the case of '18 relevant out of 81 possible channel components', or even larger problems such as '40 out of 400' for all potential subsets of channel components.

A fully allocated matrix is used for the novel CSI allocation matrix $C_{99\_V}$, i.e., in case of '18 out of 81' each of the 81 beams (or Tx antennas) transmit on all 18 CSI resource elements predefined CSI reference signals. Transmitting the same CSI RS from all beams would make the beams indistinguishable due to mutual interference. For that reason, each beam transmits—instead of zero or ones—a beam specific CSI RS signal vector CSI_RS_beam(i_beam) of size $\mathbb{C}^{18 \times 1}$, where i_beam=1 . . . 81 is the index of the antenna port or beam index.

The next question is which CSI_RS_beam vector will lead to full rank under all possible channel combinations, such as subsets of 18 relevant out of 81 channel components. In an embodiment, a Vandermonde like matrix is used to ensure full rank under all possible channel combinations. The reason is that all elements of the resulting code matrix will have inherently mutually different values avoiding any potential linear dependencies between any subsets of channel components.

Furthermore, according to certain embodiments, it is useful to use a matrix where all reference signals on all resource elements have same Tx power, i.e. the power of '1', so that as a result only the phase is suitably varied over all elements of the code matrix. Otherwise, some of the CSI reference signals would be more sensitive against noise than others.

Using a definition similar to a Vandermonde matrix and exploiting a geometric progression—here in each column—embodiments arrive at the following code matrix defining the CSI-RS Tx signal with index i for each beam k:

$$C_{99\_V}(i,k,\Phi_V)=\exp(j \cdot (k \cdot \Phi_V)^i); \ i=1 \ldots 18; \ k=1 \ldots 81.$$

The whole matrix is defined by the single phase value $\phi_V$, which is given in radian and should be chosen sufficiently large to avoid a badly conditioned matrix $C_{99\_V}$. For the simulations discussed below a value of $\phi_V=1.136$ has been used.

For estimation of the radio channel vector $h_{sparse\_est}(UE_i)$, the Moore Penrose pseudo inverse of $C_{99\_V}(:, ih_{relevant})$ is calculated, where $ih_{relevant}(UE_i)$ is the set of relevant channel components falling into the power window $p_{win}(UE_i)=p_{max}-TH$ for a certain UE, where $p_{max}$ is the Rx power of the strongest channel component (or beam) and TH is a predefined threshold in dB (for simulations −23 dB has been chosen). \ih$_{relevant}$ is the inverse set, i.e., the set of channel components or beams falling below the given threshold TH.

Then, the estimated sparse set of channel components h$_{sparse\_est}$ can be derived from the Rx signal y$_{UE\_i}$ at UE i as:

$$y_{UE\_i}(ih_{relevant})=C_{99\_V}(1\ldots 18,ih_{relevant})h(ih_{relevant})+ C_{99\_V}(1\ldots 18,\overline{ih}_{relevant})h(\overline{ih}_{relevant})+n;$$

$$h_{sparse\_est}(ih_{relevant})=\text{pinv}(C_{99\_V}(1\ldots 18,ih_{relevant}))y_{UE\_i}(ih_{relevant});$$

$$E=h_{sparse\_est}(ih_{relevant})-h(ih_{relevant});$$

Figure 10:
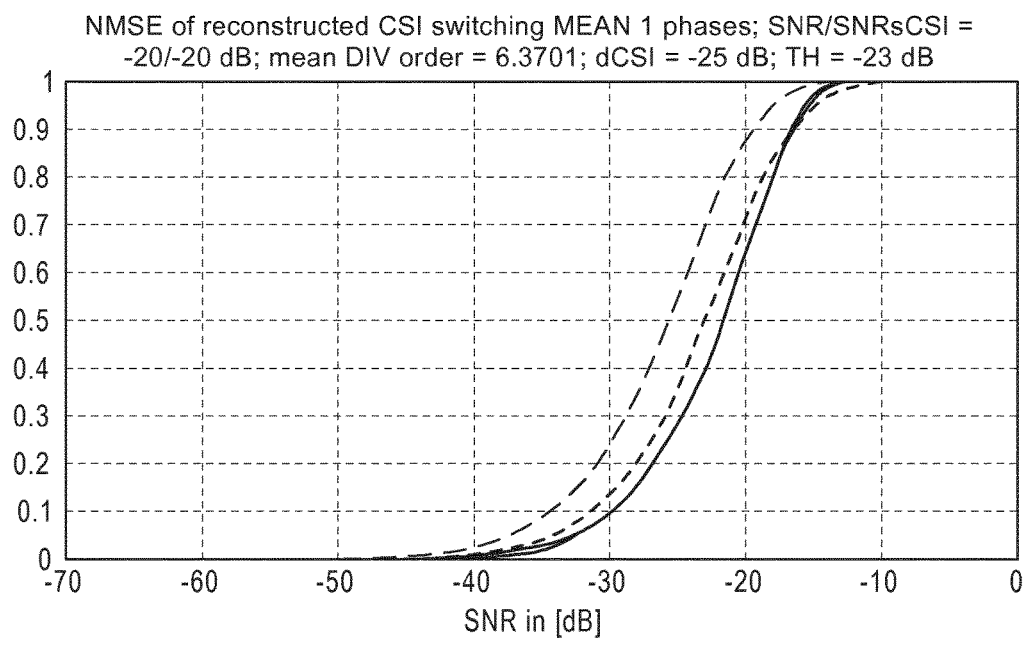
FIG. 10 illustrates simulated estimation error 10 log(abs (E)) in dB for different estimation concepts and an Rx sided SNR of 20 dB, according to an embodiment.

As can be seen, y$_{UE\_i}$ is composed of three terms, where the first is that for the wanted channel components, while the second term is interference generated from the channel components falling below the threshold TH and n is an additive white Gaussian noise AWGN vector of size $\mathbb{C}^{18\times 1}$. E is the according estimation error due to the noisy Rx signal and the intra cooperation area interference generated by the irrelevant channel components. In an embodiment, E should have a similar—or better—performance than the estimation based on CSI reference signals per channel component with the same signal to interference and noise ratio (SINR) at the receiver. Note, E in this case may be closely related to the normalized mean square error (NMSE) as all channel components are normalized to the strongest channel component. FIG. 10 illustrates a graph in which the CSI estimate error E discussed above has been calculated.

In particular, the example of FIG. 10 illustrates simulated estimation error 10 log(abs(E)) in dB for different estimation concepts and an Rx sided SNR of 20 dB. The line on the right side of the graph of FIG. 10 depicts conventional estimation with one CSI RS per channel component; the line in the center of the graph of FIG. 10 depicts estimation based on C$_{99\_V}$, according to an embodiment; and the line on the left side of the graph of FIG. 10 depicts estimate based on C$_{99\_V}$ together with a phase switching concept (2 different different $\phi_V$ values), according to an embodiment. It is noted that, in this case, the estimation error is about 5 dB lower than the a priory SNR of the line depicting conventional estimation.

By comparing the line depicting conventional estimation with the line depicting estimation based on C$_{99\_V}$, it can be concluded that similar performance as for conventional estimation based on a single CSI reference signal per channel component can be achieved; even though the statistics are a little bit different due to the different underlying error processes (note for single CSI the error signal has the well-known Rayleigh distribution).

Thus, one embodiment allocates coded CSI RSs for estimation of sparse channel vectors similar to a Vandermonde matrix, thereby ensuring always full rank and high CSI estimation quality. As a result, all channel components transmit on all CSI resource elements, but with beam individual weights on each CSI RS.

The estimation quality may depend to a large extent on the condition of C$_{99\_V}$(:, ih$_{relevant}$) and may vary for different channel components depending on the weights of pinv (C$_{99\_V}$(:, ih$_{relevant}$)). For that reason, in an embodiment, the CSI RS Tx values may be calculated for 2 or more different $\phi_V$ values defining the C$_{99\_V}$ matrix.

Figure 11:
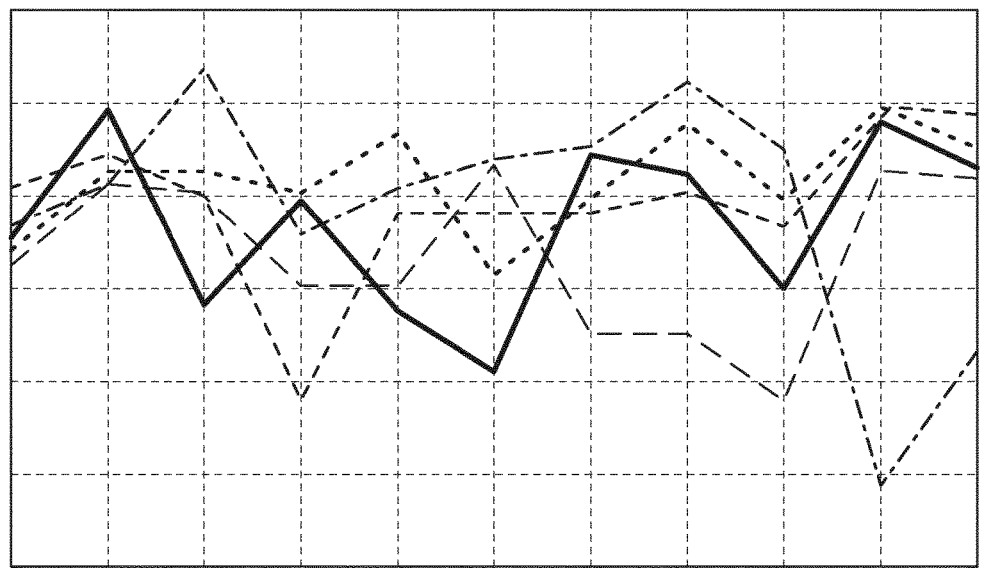
FIG. 11 illustrates the estimation error E in dB for 11 relevant channel components (x-axis) and five different phase values $\phi_V$ used for the definition of $C_{99\_V}$, according to an embodiment.

FIG. 11 illustrates the estimation error E in dB for 11 relevant channel components (x-axis) and five different phase values $\phi_V$ used for the definition of C$_{99\_V}$. As can be concluded from FIG. 11, the resulting estimation error per channel component varies for different phase values often by 10 or more dB. Therefore, one embodiment may include, as an extension to the baseline concept, estimating each channel component twice—or even more often—for different $\phi_V$ values, which have been agreed on in advance. For the final estimation, the mean or the minimum value may be used over the two or more estimations. In this way, the estimation error can be reduced by several dB as demonstrated by the line on the left side of FIG. 10. Note this gain is not just due to higher SNR from repetition coding as the extra error terms of the irrelevant channel components are here the main limitation and not the SINR. It should also be noted that, even with an a priory SINR of 15 dB, almost similar performance will be achieved. Therefore, in view of the above, an embodiment is directed to estimating CSI RSs twice or more often with different predefined $\phi_V$ values for the generation of C$_{99\_V}$ to overcome intra cooperation area interference limits with accordingly several dB better estimation quality.

Another embodiment may use some form of block diagonalization of the estimation process, meaning that the overall channel components are separated into lower dimensioned subsets of individual CSI reference signals. In this manner, the overall large estimation problem is sub divided into smaller sets of sub problems which might be easier to handle, e.g., with respect to the condition number of the channel matrix or more importantly with respect to inter code interference (see more info below). It is noted that, in this embodiment, the overall overhead may be larger as the block diagonal structure is less effective than the solution for all channel components.

In view of the above, the allocation of channel components mechanism is optimized by allocating coded CSI RSs for the estimation of sparse channel vectors similar to a Vandermonde matrix, thereby ensuring always full rank and high CSI estimation quality. As such, all channel components transmit on all CSI resource elements, but with beam individual weights on each CSI RS.

There is a further potential error term affecting the CSI estimation accuracy, i.e., the inter code interference due to allocation of CSI reference signals to different frequency bins and time slots. Embodiments of the invention, which are well adapted to the coherence bandwidth and time, should be able to achieve an inter code interference less than 20 to 25 dB, which would lead to a negligible degradation of the overall estimation performance. Therefore, it should be noted that, in the simulations of FIG. 10, inter code interference of −25 dB is already included, but also with −20 dB there would be only marginal degradations.

To minimize inter code interference for coded CSI, embodiments may exploit interpolation gains so that resource elements with bad estimation will be supported by close, good resource elements. Generally, closest possible allocation of CSI RS to each other in time and/or frequency domain may be used to stay well in the coherence time and coherence bandwidth. Small cells with essentially flat radio channels can be expected to provide low inter code IF anyway.

In an embodiment, code splitting into block diagonal sub problems may be used to reduce inter code interference as the number of CSI reference signals affected by inter code interference is reduced. Therefore, the CSI RS can be allocated more closely in frequency and time.

In another embodiment, the inter code interference may be corrected by zero forcing like approaches or even including channel prediction for estimation and correction of the inter code interference. Another alternative is an iterative estimation of the form: estimate CSI→estimate inter code IF→adapt CSI estimate→ . . . .

Generally, one might add from time to time resource elements with clean CSI per channel component or per subset of channel components being completely free of inter code interference as well as intra cooperation area interference. For example, at the beginning a first accurate start estimation or intermittently accurate estimations using larger overhead might be helpful to overcome challenging outliers. This leads to a trade off of overhead versus performance.

Figure 12:
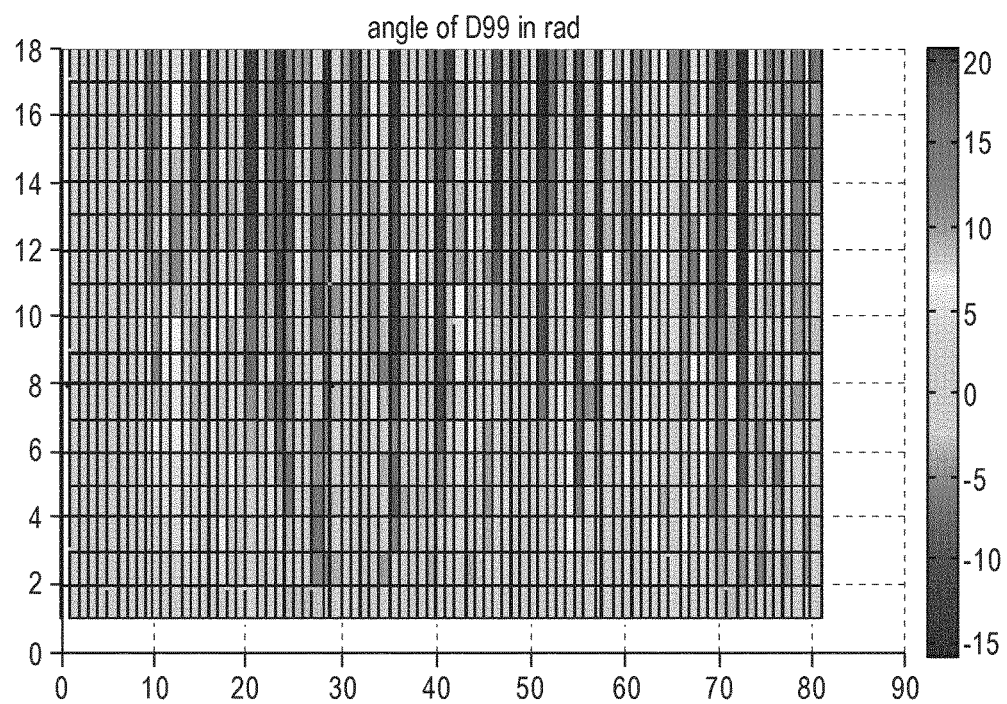
FIG. 12 illustrates an example of phase values in radian of Vandermonde-like $C_{99\_V}$ matrix, according to an embodiment.

FIG. 12 illustrates an example of phase values in radian of Vandermonde-like $C_{99\_V}$ matrix used as Tx phases of the 18 CSI-RSs for the 81 effective beams forming a cooperation area or a massive MIMO array. In the example of FIG. 12, all amplitude values are '1'.

Figure 13:
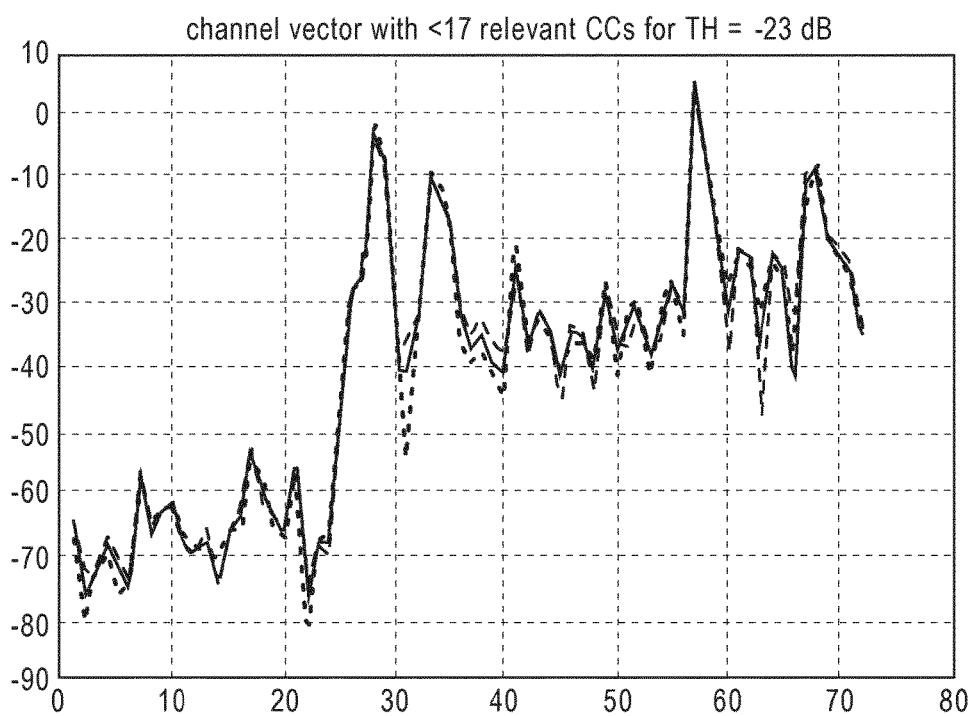
FIG. 13 illustrates typical Rx power of channel vector h, according to an embodiment.

FIG. 13 illustrates typical Rx power of channel vector h seen by a UE based on system level results for a cooperation area of 9 cells with 8 beams per cell formed by 8×32 massive MIMO arrays. As expected, there are only few relevant and many very low power channel components, i.e., h is sparse.

Figure 14A:
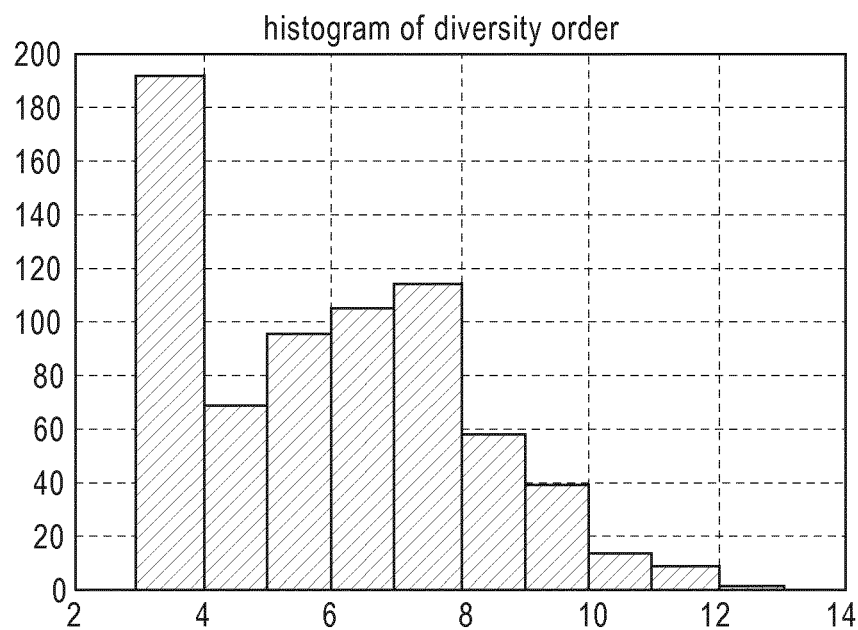
FIG. 14a illustrates a histogram of diversity order for the cooperation area as defined in FIG. 13, according to an embodiment.
Figure 14B:
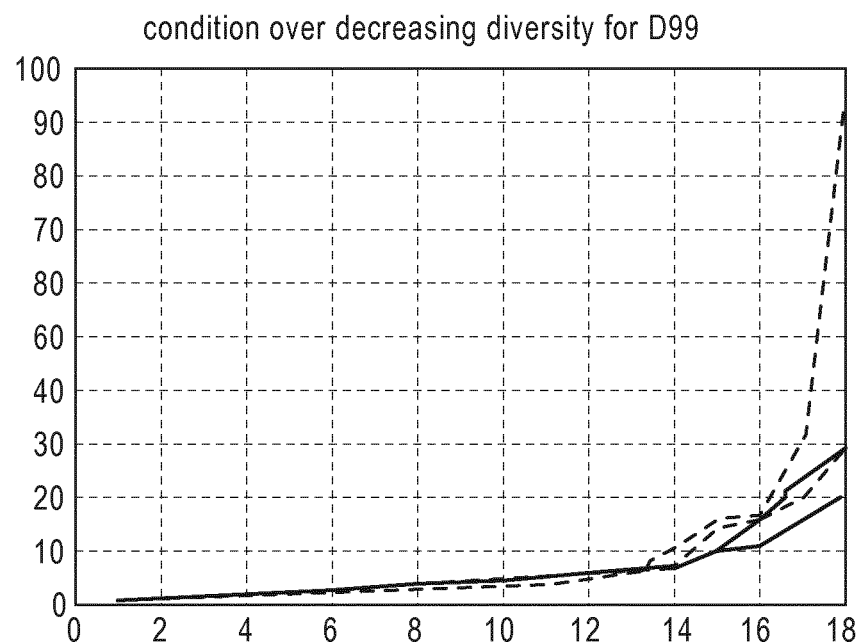
FIG. 14b illustrates a typical condition of different sub arrays of $C_{99\_V}$ made of different sets of relevant channel components, according to an embodiment.

FIG. 14a illustrates a histogram of diversity order for the cooperation area as defined in FIG. 13. FIG. 14b illustrates a typical condition of different sub arrays of $C_{99\_V}$ made of different sets of relevant channel components. In this case, a maximum number of 16 CCs has been allowed, i.e., for 18 CSI-RS minimum diversity order is 2—to avoid ill conditioned matrices $C_{99\_V}(:, ih_{relevant})$ with accordingly bad estimation performance.

Figure 7A:
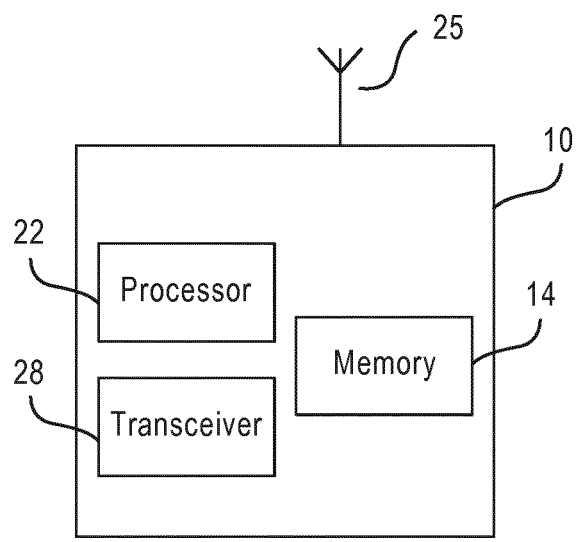
FIG. 7a illustrates an example block diagram of an apparatus, according to an embodiment.

FIG. 7a illustrates an example of an apparatus 10 according to an embodiment. In an embodiment, apparatus 10 may be a node, host, or server in a communications network or serving such a network, such as a base station or eNB in LTE. It should be noted that one of ordinary skill in the art would understand that apparatus 10 may include components or features not shown in FIG. 7a.

As illustrated in FIG. 7a, apparatus 10 includes a processor 22 for processing information and executing instructions or operations. Processor 22 may be any type of general or specific purpose processor. While a single processor 22 is shown in FIG. 7a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node, such as a base station in a communications network or an eNB in LTE. In this embodiment, apparatus 10 may be controlled by memory 14 and processor 22 to allocate channel components into a square matrix. For example, in one embodiment, apparatus 10 may be controlled to allocate to each row of the square matrix one of a plurality of CSI-RSs and to allocate to each column of the square matrix another one of the plurality of CSI-RSs. According to an example embodiment, the CSI-RSs may comprise a subset of 9 vertical CSI-RSs and a subset of 9 horizontal CSI-RSs, such that the channel components may comprise 81 channel components.

Figure 7B:
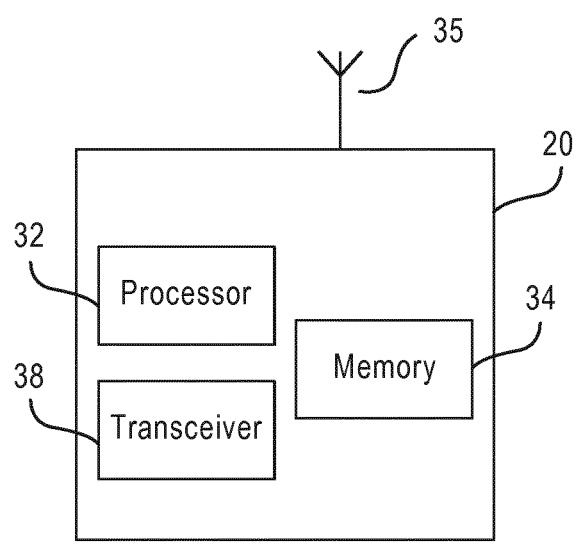
FIG. 7b illustrates an example block diagram of an apparatus, according to another embodiment.

FIG. 7b illustrates an example of an apparatus 20 according to another embodiment. In an embodiment, apparatus 20 may be a mobile device in a communications network, such as a UE in LTE. It should be noted that one of ordinary skill in the art would understand that apparatus 20 may include components or features not shown in FIG. 7b.

As illustrated in FIG. 7b, apparatus 20 includes a processor 32 for processing information and executing instructions or operations. Processor 32 may be any type of general or specific purpose processor. While a single processor 32 is shown in FIG. 7b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device in a communications network, such as a UE in LTE. In this embodiment, apparatus 20 may be controlled by memory 34 and processor 32 to obtain or receive an allocation of channel components in a square matrix H. In an embodiment, each row of the square matrix H is allocated one of a plurality of CSI-RSs and each column of the square matrix H is allocated another one of the plurality of CSI-RSs. According to one embodiment, apparatus 20 may then be controlled by memory 34 and processor 32 to reconstruct the relevant channel components by estimating the relevant channel components. In certain embodiments, apparatus 20 may be controlled by memory 34 and processor 32 to identify the relevant channel components based on long term measurements of path loss values.

According to one embodiment, apparatus 20 may be controlled by memory 34 and processor 32 to estimate the relevant channel components by forming a component matrix, C_NN, for the estimation of N channel components, where there are 2N channel state information resource signals and the component matrix has size $\mathbb{R}^{N^2 \times N^2}$. In one example embodiment, N may be equal to 9, there may be 18 CSI-RSs, and the component matrix may have size $\mathbb{R}^{81 \times 81}$.

In an embodiment, apparatus 20 may be controlled by memory 34 and processor 32 to reduce the component matrix, C_NN, to a matrix, C_NN_sparse(UE_i), with size $\mathbb{R}^{2N \times 2N}$ using knowledge of irrelevant channel components. The irrelevant channel components may be those for which H(i,k) is below a certain threshold power with respect to a strongest channel component. According to one embodiment, apparatus 20 may construct C_NN_sparse(UE_i) from C_NN by deleting all zero rows and $N^2-2N$ columns l_irrelevant found from irrelevant channel components of H(i,k) by forming h(l)=vec(H(i,k)).

Then, in certain embodiments, apparatus 20 may be controlled by memory 34 and processor 32 to calculate an estimate of the relevant channel components, h_sparse_est (UE_i), according to the following equation:

$$h\_sparse\_est(UE\_i) = pinv(C\_NN\_sparse(UE\_i)) * y(UE\_i),$$

where y(UE_i) is an estimation vector of size $\mathbb{C}^{2N \times 1}$ of the received signals for all 2N CSI RSs for UE, UE_i, and pinv(x) is the Moore Penrose pseudo inverse.

In another embodiment, apparatus 20 may be controlled by memory 34 and processor 32 to allocate coded CSI-RSs for estimation of sparse channel vectors similar to a Vandermonde matrix, ensuring always full rank and high CSI estimation quality. Using a definition similar to a Vandermonde matrix and exploiting a geometric progression, apparatus 20 may apply the following code matrix defining the CSI-RS Tx signal with index i for each beam k:

$$C_{99\_V}(i,k,\Phi_V) = \exp(j \cdot (k \cdot \Phi_V)^i); \ i=1 \ldots 18; \ k=1 \ldots 81.$$

The whole matrix is defined by the single phase value $\phi_V$.

In yet another embodiment, apparatus 20 may be controlled by memory 34 and processor 32 to estimate CSI-RSs twice or more with different predefined $\phi_V$ values for the generation of $C_{99\_V}$. This estimation of each channel component twice, or more often, may be done to overcome intra cooperation area interference limits with accordingly several dB better estimation quality.

Figure 8A:
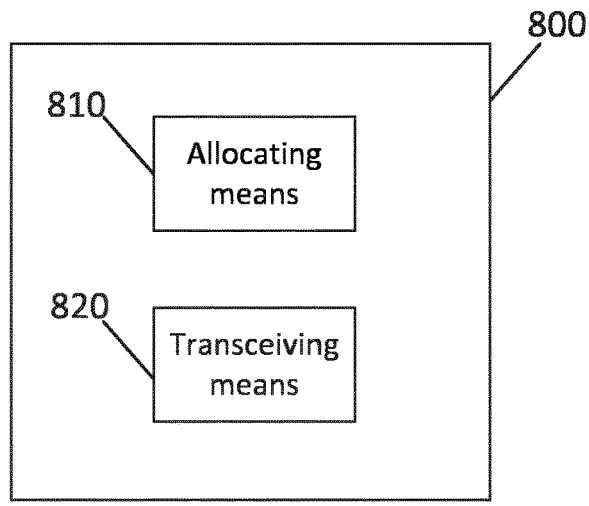
FIG. 8a illustrates an example block diagram of an apparatus, according to an embodiment.

FIG. 8a illustrates a block diagram of an apparatus 800, according to an embodiment. In one example, apparatus 800 may be a base station or eNB. In this example, apparatus 800 may include at least an allocating unit or means 810 and a transceiving unit or means 820. According to one embodiment, the allocating means 810 allocates channel components into a square matrix. For example, the allocating means 810 may include means for allocating to each row of the square matrix one of a plurality of CSI-RSs and for allocating to each column of the square matrix another one of the plurality of CSI-RSs. In an embodiment, transceiving means 820 may then transmit the allocation of the channel components in the square matrix to one or more UEs.

Figure 8B:
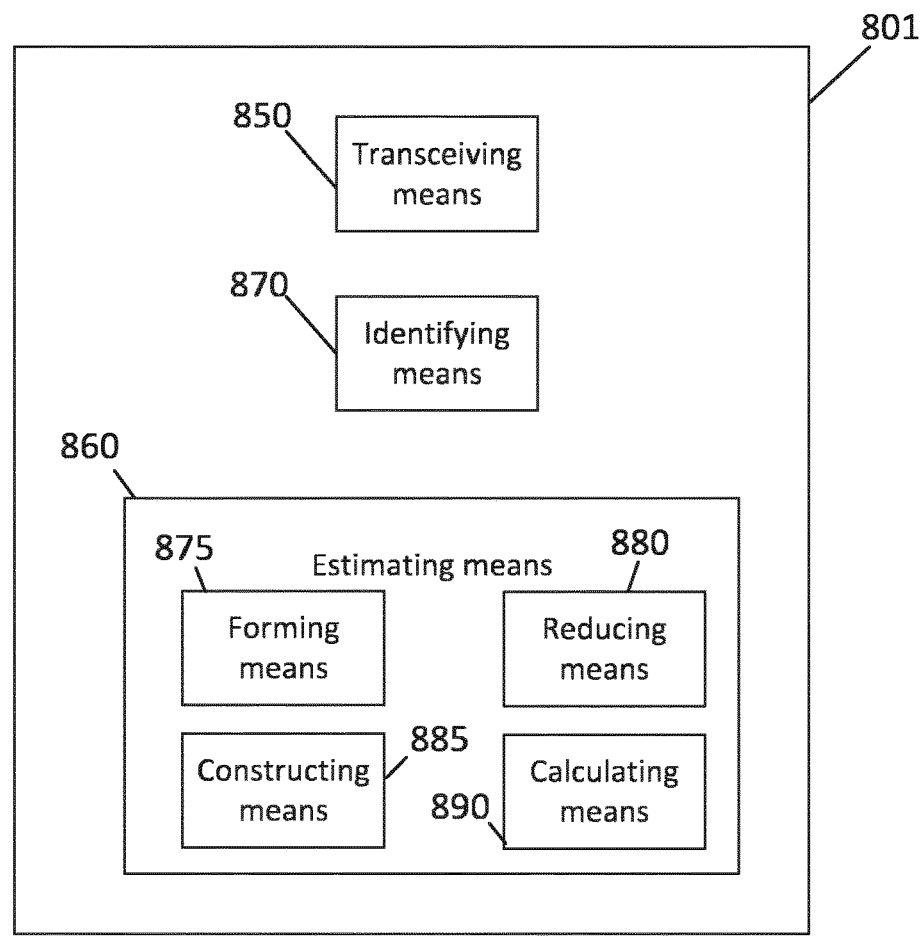
FIG. 8b illustrates an example block diagram of an apparatus, according to another embodiment.

FIG. 8b illustrates a block diagram of an apparatus 801, according to an embodiment. In one example, apparatus 801 may be a mobile device or UE. In this example, apparatus 801 may include at least a transceiving unit or means 850, an estimating unit or means 860, and an identifying unit or means 870. In one embodiment, transceiving means 850 may receive an allocation of channel components in a square matrix H, where each row of the square matrix H is allocated one of a plurality of CSI-RSs and each column of the square matrix H is allocated another one of the plurality of CSI-RSs. Then, according to an embodiment, estimating means 860 may reconstruct relevant channel components by estimating the relevant channel components.

According to one embodiment, identifying means 870 may identify the relevant channel components based on long term measurements of path loss values. In an embodiment, the estimating means 860 may include forming means 875 for forming a component matrix, C_NN, for the estimation of N channel components, where there are 2N channel state information resource signals and the component matrix has size $\mathbb{R}^{N^2 \times N^2}$. According to one example embodiment, N may be equal to 9, there may be 18 CSI-RSs, and the component matrix may have size $\mathbb{R}^{81 \times 81}$.

In an embodiment, the estimating means 860 may further include reducing means 880 for reducing the component matrix, C_NN, to a matrix, C_NN_sparse(UE_i), with size $\mathbb{R}^{2N \times 2N}$ using knowledge of irrelevant channel components, where the irrelevant channel components are those for which H(i,k) is below a certain threshold power with respect to a strongest channel component. The estimating means 860 may also include, according to an embodiment, constructing means 885 for constructing C_NN_sparse(UE_i) from C_NN by deleting all zero rows and $N^2$-2N columns l_irrelevant found from irrelevant channel components of H(i,k) by forming h(l)=vec(H(i,k)).

According to one embodiment, the estimating means 860 further includes calculating means 890 for calculating an estimate of the relevant channel components, h_sparse_est(UE_i), according to the following equation:

$$h\_sparse\_est(UE\_i) = pinv(C\_NN\_sparse(UE\_i))*y(UE\_i),$$

where y(UE_i) is an estimation vector of size $\mathbb{C}^{2N \times 1}$ of the received signals for all 2N CSI RSs for UE, UE_i, and pinv(x) is the Moore Penrose pseudo inverse.

In another embodiment, the estimating means 860 may allocate coded CSI-RSs for estimation of sparse channel vectors similar to a Vandermonde matrix, ensuring always full rank and high CSI estimation quality. Using a definition similar to a Vandermonde matrix and exploiting a geometric progression, estimating means 860 may apply the following code matrix defining the CSI-RS Tx signal with index i for each beam k:

$$C_{99\_V}(i,k,\Phi_V) = \exp(j \cdot (k \cdot \Phi_V)^i); \ i=1 \ldots 18; \ k=1 \ldots 81.$$

The whole matrix is defined by the single phase value $\phi_V$.

In yet another embodiment, estimating means 860 may estimate CSI-RSs twice or more with different predefined $\phi_V$ values for the generation of $C_{99\_V}$. This estimation of each channel component twice, or more often, may be done to overcome intra cooperation area interference limits with accordingly several dB better estimation quality.

Figure 9A:
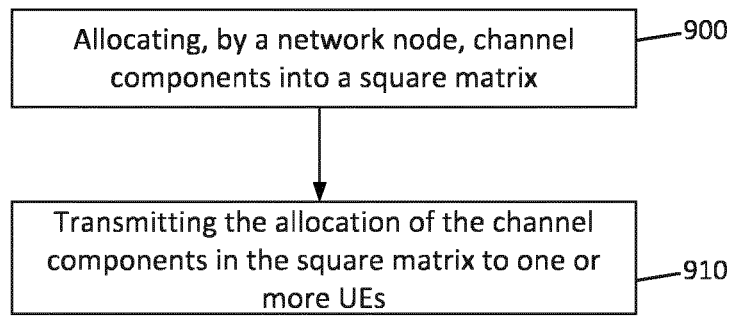
FIG. 9a illustrates an example flow diagram of a method, according to one embodiment.

FIG. 9a illustrates an example flow diagram of a method according to one embodiment. In an embodiment, the method of FIG. 9a may be executed by a network node, such as a base station or eNB. The method may include, at 900, allocating, by the network node, channel components into a square matrix. The allocating may include allocating to each row of the square matrix one of a plurality of CSI-RSs and allocating to each column of the square matrix another one of the plurality of CSI-RSs. In one embodiment, the method may further include, at 910, transmitting (or otherwise providing) the allocation of the channel components in the square matrix to one or more UEs.

Figure 9B:
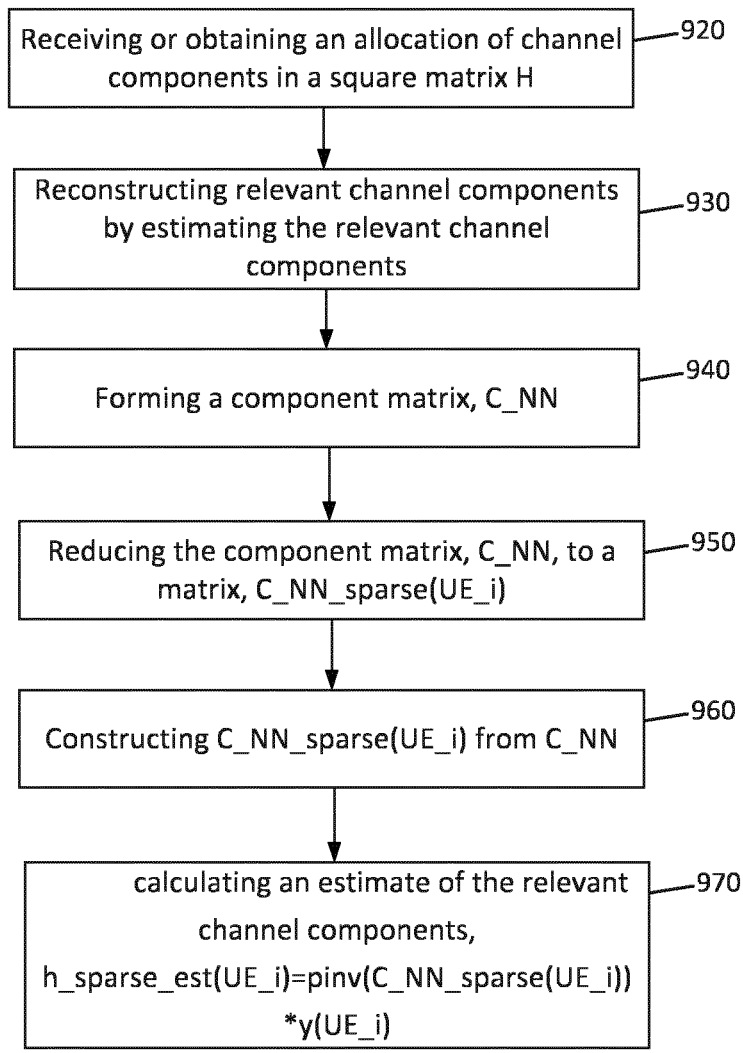
FIG. 9b illustrates an example flow diagram of a method, according to another embodiment.

FIG. 9b illustrates an example flow diagram of a method according to one embodiment. In an embodiment, the method of FIG. 9b may be executed by a mobile device, such as a UE. The method may include, at 920, receiving or obtaining an allocation of channel components in a square matrix H, where each row of the square matrix H is allocated one of a plurality of CSI-RSs and each column of the square matrix H is allocated another one of the plurality of CSI-RSs. The method may then include, at 930, reconstructing relevant channel components by estimating the relevant channel components. In one embodiment, the method may include identifying the relevant channel components based on long term measurements of path loss values.

In certain embodiments, the estimating of the relevant channel components may further include, at 940, forming a component matrix, C_NN, for the estimation of N channel components, wherein there are 2N channel state information resource signals and the component matrix has size $\mathbb{R}^{N^2 \times N^2}$. In an example embodiment, N may be equal to 9, there may be 18 CSI-RSs, and the component matrix has size $\mathbb{R}^{81 \times 81}$.

According to an embodiment, the estimating of the relevant channel components may further include, at 950, reducing the component matrix, C_NN, to a matrix, C_NN_sparse(UE_i), with size $\mathbb{R}^{2N \times 2N}$ using UE's knowledge of irrelevant channel components, where the irrelevant channel components are, for example, those for which H(i,k) is below a certain threshold power with respect to a strongest channel component. In one embodiment, the estimating of the relevant channel components may further include, at 960, constructing C_NN_sparse(UE_i) from C_NN by deleting all zero rows and $N^2$-2N columns l_irrelevant found from irrelevant channel components of H(i,k) by forming h(l)=vec(H(i,k)).

According to certain embodiments, the method may then include, at 970, calculating an estimate of the relevant channel components, h_sparse_est(UE_i), according to the following equation:

$$h\_sparse\_est(UE\_i) = pinv(C\_NN\_sparse(UE\_i))*y(UE\_i),$$

where y(UE_i) is an estimation vector of size $\mathbb{C}^{2N \times 1}$ of the received signals for all 2N CSI RSs for UE, UE_i, and pinv(x) is the Moore Penrose pseudo inverse.

In another embodiment, the method of FIG. 9b may also include allocating coded CSI-RSs for estimation of sparse channel vectors similar to a Vandermonde matrix, ensuring always full rank and high CSI estimation quality. Using a definition similar to a Vandermonde matrix and exploiting a geometric progression, the method may include applying the following code matrix defining the CSI-RS Tx signal with index i for each beam k:

$$C_{99\_V}(i,k,\Phi_V) = \exp(j \cdot (k \cdot \Phi_V)^i); \ i=1 \ldots 18; \ k=1 \ldots 81.$$

The whole matrix is defined by the single phase value $\phi_V$.

In yet another embodiment, the method of FIG. 9b may also include estimating CSI-RSs twice or more with different predefined $\phi_V$ values for the generation of $C_{99\_V}$. This estimation of each channel component twice, or more often, may be done to overcome intra cooperation area interference limits with accordingly several dB better estimation quality.

In some embodiments, the functionality of any of the methods described herein, such as those illustrated in FIG. 9a or 9b discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

In view of the above, embodiments of the invention may provide several advantages and/or benefits. For example, as massive MIMO is seen as one of the main components of a future 5G system and one of the most challenging implementation topics is an accurate channel estimation for large to very large number of antenna elements, embodiments provide a powerful solution exploiting inherent characteristics of massive MIMO and JT CoMP. For massive MIMO—with and without CoMP—the typical channel matrices will be large, but the effective channels will be sparse due to the strong beamforming gains of massive MIMO arrays. Embodiments of the invention allow for a reduction in the number of CSI-RSs to the much smaller number of relevant channel components per UE. As a result, a benefit is that each UE can reconstruct its own and different set of relevant channel components by using the side knowledge of its irrelevant channel components.

Further, due to the square law 40 orthogonal CSI RSs would allow to serve 400 overall channel components or APs, which can be expected to be fully sufficient for future 5G macro scenarios. This means massive MIMO with hundreds of antennas might be introduced reusing already standardized reference signals. Also, according to embodiments, the reduction ratios are very high, for example for 18 CSI-RSs the ratio is 81/18=4.5 and for 40 CSI-RSs already 400/40=10. Additionally, the implementation at eNB side is relatively easy as it just means a new but fixed re-allocation of CSI-RSs to APs. At the receiver side, an additional multiplication with a 2N×2N matrix will be needed, which results in relatively low overhead compared to overall Rx processing.

A main benefit of coded CSI is the option to estimate UE individual sparse channel vectors from a very large set of potential channel components. This allows embodiments to implement massive MIMO, large CoMP areas as well as large HetNet scenarios in FDD mode with moderate to very low overhead for channel estimation.

The embodiment based on Vandermonde like allocation of CSI RSs to beams or channel components ensures full rank for all potential subsets of channel components, something which cannot be achieved for the original proposal in case of large number of channel components.

The transmission of CSI reference signals on all available resource elements can provide significant SNR gains, at least for UEs with high diversity order as in that case the same channel components are estimated several times by different CSI RSs. Therefore, the estimation error might be even below the a priory SNR or SINR at the receiver. Even for an SINR of −15 dB the estimation error might be below −20 dB or even better. This can be very useful for multi cell scenarios with according inter cell interference.

For low diversity orders, like one or two, the condition of the estimation matrices will become very high with accordingly bad estimation performance. Therefore, embodiments are designed so that sufficient or maximum sparsity of the overall channel matrices is always guaranteed. For example, higher RF frequencies, UE sided beamformers, strong massive MIMO beamforming, etc. helps to limit number of relevant channel components to a predefined maximum.

The double or multiple estimation with different $\phi_V$ values, according to certain embodiments, outperforms conventional channel estimation with single CSI RS per antenna port. This might be implemented in different ways such as, for example, by twice or multiple transmission of CSI RSs leading to according higher overhead for the multiple estimations. Further embodiments may use some form of interpolation between different time of frequency bins using different $\phi_V$ values on adjacent time or frequency bins so that no extra overhead is required.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. An apparatus, comprising:
   at least one processor;
   at least one memory including computer code,
   the at least one memory and the computer code configured, with the at least one processor, to cause the apparatus to perform at least the following:
   allocate channel components into a square matrix,
   wherein one of a plurality of channel state information resource signals is allocated to each row of the square matrix and another one of the plurality of channel state information resource signals is allocated to each column of the square matrix, and wherein the channel components are configured for a component matrix C_NN to be formed for the estimation of N channel components, wherein there are 2N channel state information resource signals and the component matrix has size $\mathbb{R}^{N^2 \times N^2}$.

2. The apparatus according to claim 1, wherein the channel state information resource signals comprise a subset of 9 vertical channel state information resource signals and a subset of 9 horizontal channel state information resource signals, and wherein the channel components comprise 81 channel components.

3. An apparatus, comprising:
   at least one processor;
   at least one memory including computer code, the at least one memory and the computer code configured, with the at least one processor, to cause the apparatus to perform at least the following:
   receive an allocation of channel components in a square matrix H, wherein each row of the square matrix H is allocated one of a plurality of channel state information resource signals and each column of the square matrix H is allocated another one of the plurality of channel state information resource signals; and
   reconstruct relevant channel components by estimating relevant channel components, wherein a component matrix C_NN is formed for the estimation of N channel components, wherein there are 2N channel state information resource signals and the component matrix has size $\mathbb{R}^{N^2 \times N^2}$.

4. The apparatus according to claim 3, wherein the component matrix, CNN, is reduced to a matrix, CNNsparse (UE_i), with size R2N×2N using knowledge of irrelevant channel components, wherein the irrelevant channel components are those for which H(i,k) is below a certain threshold power with respect to a strongest channel component.

5. The apparatus according to claim 4, wherein the matrix, C_NN_sparse(UE_i) is constructed from C_NN by deleting all zero rows and $N^2-2N$ columns l_irrelevant found from irrelevant channel components of H(i,k) by forming h(l) =vec(H(i,k)).

6. The apparatus according to claim 4, wherein an estimate of relevant channel components, h_sparse_est(UE_i), is calculated according to the following equation:

$$h\_sparse\_est(UE\_i) = pinv(C\_NN\_sparse(UE\_i))*y(UE\_i),$$

wherein y(UE_i) is an estimation vector of size $\mathbb{C}^{2N \times 1}$ of the received signals for all 2N CSI RSs for UE, UE_i, and pinv(x) is a Moore Penrose pseudo inverse.

7. A method, comprising:

receiving, by a user equipment, an allocation of channel components in a square matrix H, wherein each row of the square matrix H is allocated one of a plurality of channel state information resource signals and each column of the square matrix H is allocated another one of the plurality of channel state information resource signals; and reconstructing relevant channel components by estimating relevant channel components wherein the estimating further comprises forming a component matrix, C_NN, for the estimation of N channel components, wherein there are 2N channel state information resource signals and the component matrix has size $\mathbb{R}^{N^2 \times N^2}$.

8. The method according to claim 7, wherein the estimating further comprises reducing the component matrix, C_NN, to a matrix, C_NN_sparse(UE_i), with size $\mathbb{R}^{2N \times 2N}$ using knowledge of irrelevant channel components, wherein the irrelevant channel components are those for which H(i,k) is below a certain threshold power with respect to a strongest channel component.

9. The method according to claim 8, wherein the estimating further comprises constructing C_NN_sparse(UE_i) from C_NN by deleting all zero rows and $N^2$-2N columns l_irrelevant found from irrelevant channel components of H(i,k) by forming h(l)=vec(H(i,k)).

10. The method according to claim 8,
wherein the estimating further comprises calculating an estimate of relevant channel components, h_sparse_est(UE_i), according to the following equation:

$$h\_sparse\_est(UE\_i) = pinv(C\_NN\_sparse(UE\_i))*y(UE\_i),$$

wherein y(UE_i) is an estimation vector of size $\mathbb{C}^{2N \times 1}$ of the received signals for all 2N CSI RSs for UE, UE_i, and pinv(x) is a Moore Penrose pseudo inverse.

* * * * *

UNITED STATES PATENT AND TRADEMARK OFFICE
CERTIFICATE OF CORRECTION

PATENT NO. : 10,243,712 B2
APPLICATION NO. : 15/528937
DATED : March 26, 2019
INVENTOR(S) : Wolfgang Zirwas Page 1 of 1

It is certified that error appears in the above-identified patent and that said Letters Patent is hereby corrected as shown below:

On the Title Page

In Foreign Application Priority Data:
(30), "Jan. 23, 2015" should be deleted and --Dec. 02, 2014-- should be inserted.

In the Claims

In Claim 4:
Column 20, Line 53, "CNN" should be deleted and --C_NN-- should be inserted.

In Claim 4:
Column 20, Line 54, "R2N×2N" should be deleted and --$\mathbb{R}^{2N \times 2N}$-- should be inserted.

Signed and Sealed this
Fourteenth Day of May, 2019

Andrei Iancu
*Director of the United States Patent and Trademark Office*